United States Patent
Cameron et al.

(10) Patent No.: US 7,555,784 B2
(45) Date of Patent: Jun. 30, 2009

(54) METHOD AND SYSTEM FOR SAFELY DISCLOSING IDENTITY OVER THE INTERNET

(75) Inventors: Kim Cameron, Bellevue, WA (US); Arun K. Nanda, Sammamish, WA (US); Andy Harjanto, Sammamish, WA (US); Stuart L. S. Kwan, Redmond, WA (US); John P. Shewchuk, Redmond, WA (US); Bill Barnes, Seattle, WA (US); Khushru Irani, Redmond, WA (US); Charles R. Reeves, Snohomish, WA (US)

(73) Assignee: Microsoft Corporation, Redmond, WA (US)

( * ) Notice: Subject to any disclaimer, the term of this patent is extended or adjusted under 35 U.S.C. 154(b) by 873 days.

(21) Appl. No.: 11/073,404

(22) Filed: Mar. 4, 2005

(65) Prior Publication Data

US 2006/0200866 A1    Sep. 7, 2006

(51) Int. Cl.
*H04L 9/32* (2006.01)
(52) U.S. Cl. .......................................... 726/27
(58) Field of Classification Search ........................ None
See application file for complete search history.

(56) References Cited

U.S. PATENT DOCUMENTS

2004/0123157 A1 * 6/2004 Alagna et al. ................ 713/201
2005/0235351 A1 * 10/2005 Seltzer et al. ................. 726/14

FOREIGN PATENT DOCUMENTS

WO    WO2005/098630    10/2005

OTHER PUBLICATIONS

Extended European Search Report for EP 06 10 1313.
Opinion Related to the Extended European Search Report for EP 06 10 1313.

* cited by examiner

*Primary Examiner*—Kambiz Zand
*Assistant Examiner*—Aubrey H Wyszynski
(74) *Attorney, Agent, or Firm*—Merchant & Gould P.C.

(57) ABSTRACT

Exemplary embodiments disclosed herein may include a method and system for providing information to a user and safely disclosing identity information over the Internet comprising receiving information from a server, analyzing the information, presenting the analyzed information to a user for validation in a finite number of configurations controlled by a client, and validating of the information by the user.

19 Claims, 5 Drawing Sheets

METHOD AND SYSTEM FOR SAFELY DISCLOSING IDENTITY OVER THE INTERNET

TECHNICAL FIELD

The invention relates generally to the field of computer and network security. More particularly, the invention relates to authenticating the identity of computer systems for safely disclosing information over the Internet.

BACKGROUND

Many transactions involving money and/or interchange of personally identifying information occur everyday utilizing the Internet and Internet technologies. Furthermore, many dishonest people are attracted to intercepting some of these transactions and stealing money and/or personal identity information. One method for intercepting involves the use of imitation websites that are identical, or nearly identical, in appearance to legitimate websites. As a result, innocent, unsuspecting users are requested to reveal personal information, such as name, address, social security number, credit card numbers, etc., that allow the imitators (i.e. those that set up the imitation or rogue sites) to steal the identity of the user, and/or money. Such theft is a growing problem.

More and more transactions may take place in the future. As users complete more and more transactions online, their comfort level may increase. This may increase the confidence of the user that the transactions are safe and secure.

Additionally, these transactions may take place with many different websites and with many different user interfaces, making it difficult for a user to determine if the website is legitimate and not an imposter-created website as there are no predictable mileposts or any consistency in the experience of the user.

SUMMARY

Exemplary embodiments disclosed herein may include a method and system for alleviating the disadvantages noted above, as well as others. Exemplary embodiments disclosed herein may include a method and system for presenting information to a user and safely disclosing identity information over the Internet comprising receiving information from a server, analyzing the information, presenting the analyzed information to a user for validation, and validating of the information by the user.

Other embodiments may include a finite state machine system for presenting information and safely disclosing identity information over the Internet comprising, a communication module configured to receive information from a server, and transmit information to a server, an analyzing module communicationally coupled to the communication module, configured to receive information from the communication module, and a user interface module communicationally coupled to the analyzing module and the communication module, configured to present information to a user for validation, wherein the information received from the server comprises server identity information along with server requests for information.

DETAILED DESCRIPTION

Figure 1:
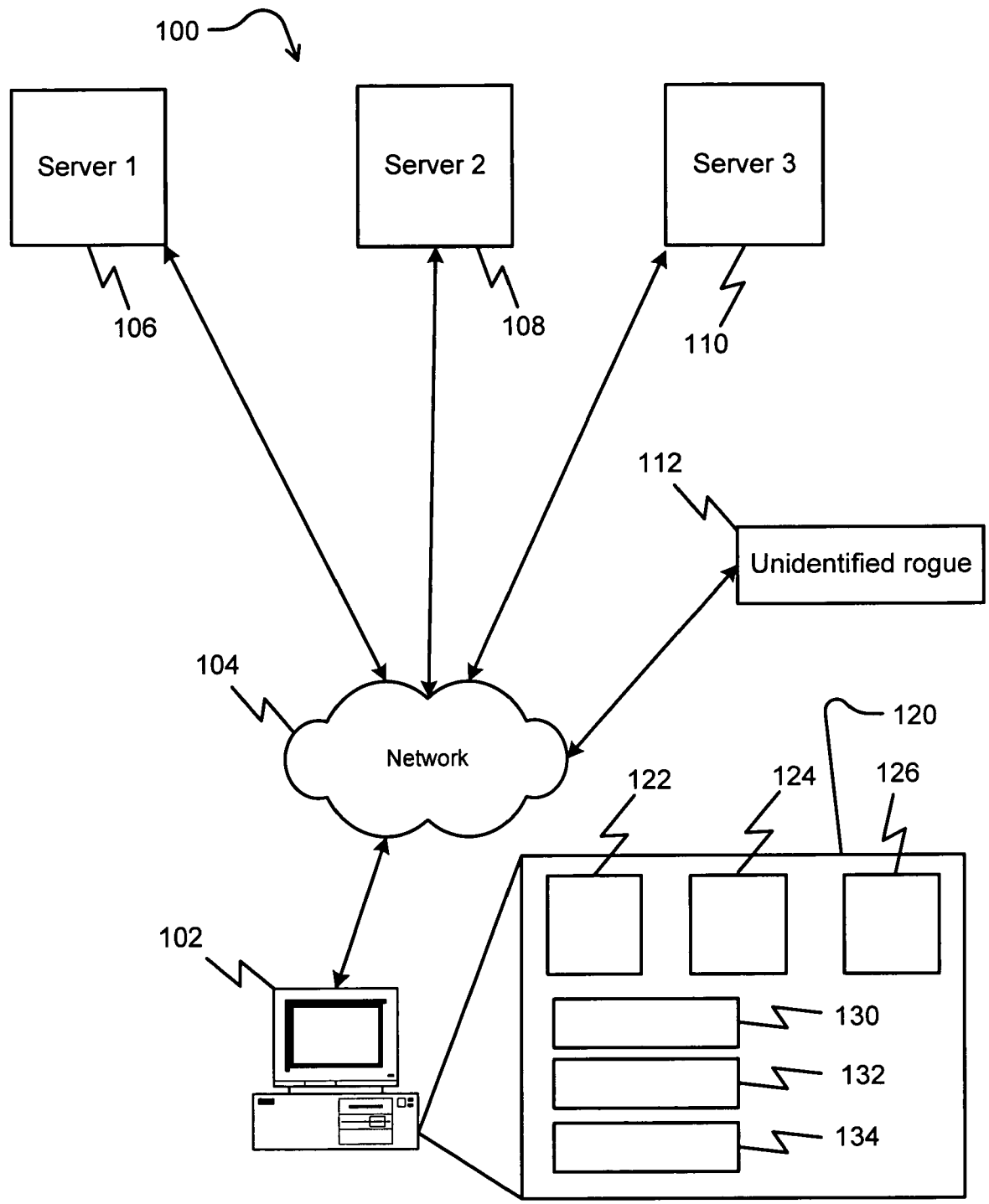
FIG. 1 is a block diagram of a system for creating attendance marker(s), and recognition of an ongoing digital relationship according to an exemplary embodiment.

FIG. 1 is a block diagram of a system, which may be utilized for presenting information to a user and safely disclosing identity over the Internet according to an exemplary embodiment, generally at 100. In this embodiment system 100 includes a client 102 that is coupled to network 104. System 100 further includes server 1 106, server 2 108 and server 3 110, also coupled to network 104.

In this embodiment, client 102 includes a user interface 120, which in turn includes visual indicators 122, 124, 126 and input fields 130, 132, and 134. When client 102 accesses server 1 106 via network 104, client 102 may request and receive identity and other information from server 1 106, or may receive a security certificate and may parse identity key and/or identity information about server 1 106. Client 102 then may provide indicators 122, 124 and 126 for a user.

Indicators 122, 124 and 126 may include the identity of the server and/or associated website, a visual secret and an identity card or other information as desired. Client 102 may parse the information received from server 1 106 such that it will provide the identity fo the server, a visual secret that may have previously been entered by the user of client 102, and identity information that may have been previously provided by the user to server 1 106. It will be appreciated that many other indictors may be utilized without straying from the concepts disclosed herein.

User interface 120 may be a very secure desktop such that an unidentified rogue 112 may not utilize spy ware, or other method to intercept or steal information from user interface 120. In this manner the identity of server 1 106 is displayed and may be related to the identity key associated with server 1 106. Furthermore, the user may include a visual secret such as a photo or other information such that indicators 122, 124 and 126 may indicate to the user that the identity of the website is being presented in a trustworthy user interface, and has not been tampered with. This, as well as other secure information would indicate to the user that the connection is secure, and allow the user to determine that the accessed website is valid, authentic and/or legitimate.

When server 1 106 and/or the associated website asks for, or requires, information, such as registering information, login information, identity information, personal information, or other information, the information received from server 1 106 may be parsed out and displayed to the user via input fields 130, 132 and 134. In this manner the control of the experience is with the user on the user interface 120 and/or secure desktop such that the user may be less likely to provide personal and/or identity information on a rogue website or a non-legitimate website.

Input fields 130, 132, and 134 may vary with the information that is requested by server 1 106 and/or its associated website. Furthermore, it will be appreciated that although three input fields are shown any number of input fields may be utilized, as desired. Similarly, although three indicators are shown, any number of indicators may be utilized without straying from the concepts disclosed herein.

Similarly, when client 102 accesses server 2 108, client 102 can request identity information, as well as other information that client 102 may have stored on server 2 108 and its associated website. If client 102 had previously stored an attendance marker or key or other authentication information on server 2 108, it could be retrieved and shown to the user via one of the visual or other indicators 122, 124 and 126, along with the identity information of the server. Since the certificate and identity key are fixed for each server and/or website it may make it more difficult for an unidentified rogue 112 to imitate the website to obtain personal information. It will be appreciated that other methods and systems may be utilized to obtain server information and/or identity. Furthermore, since the user interface is parsing the information and showing the information that is requested to the user on a secure desktop, this may make it more difficult for an unidentified rogue 112 to copy or imitate a website to obtain personal information.

User interface 120 may be one of a finite number of different interface displays that may be viewed by the user such that the user may easily identify abnormalities, irregularities or other indicators that would indicate that the user has not accessed the server and associated website that they intended to. Other interfaces may include, but are not limited to, a warning interface that alerts the user that the particular transaction or other exchange of information is taking longer than expected. This may be an indication that a dishonest person is intercepting the transmissions, among other problems. This finite number of user interfaces may make it less likely that an unidentified rogue 112 would be able to imitate a website and/or otherwise obtain information from the user via deceptive techniques.

Therefore, if client 102 had previously accessed server 2 108 and subsequently tries to access server 2 108 again, and a different identity key indicator appears on the user interface 120, this would be an indication to the client that the client has been redirected to a different website and/or an unidentified rogue has tried to imitate the website associated with server 2 108, or that server 2 108 had lost the information previously stored there. In any of these circumstances the user would have an indication that the server and/or associated website should not be trusted. This could indicate to the user to either leave the site or be very careful about the information disclosed to the website and/or associated server.

Indicators 122, 124 and 126 may also include identity information that the user has previously stored at, or disclosed to the server and/or associated website. This may be in the form of an information card, persona, or other method of indicating the type and extent of information previously disclosed to a server or associated website.

Similarly, when client 102 accesses server 3 110 via network 104, server 3 110 will have a different identity key and/or identify information than other websites and/or servers and/or web servers such that it may show up as a different visual indicator to the user. Similarly, a different identity may also be indicated, as well as different input fields 130, 132 and 134. Although each server accessed will provide different information, it will be provided to the user in a uniform manner such that the user would feel more comfortable of the identity of the server accessed, as well as the information previously disclosed, and information requested via input fields 130, 132 and 134.

Visual indicators may also include a "visual secret." This may be an arbitrary picture, identity information, or other information that the user may store on user interface 120 such that the user would feel more confident about the authenticity of the user interface and therefore more comfortable disclosing information to servers. This may be because when the visual secret appears, this would indicate to the user that a secure connection is present or the desktop is not being imitated. Furthermore, user interface 120 may be a part of a secure desktop and/or a secure area of the computer that may be totally or highly impervious to spy ware and other techniques for surreptitiously acquiring information. The visual secret would be inaccessible to unidentified rogue 112 and, therefore, would be very difficult, if not impossible, to imitate or recreate.

It will be appreciated that although a visual secret has been described in exemplary embodiments, in other embodiments the secret may be visual, audio, multimedia, biometric, and/or other data, and/or combinations thereof.

As described above, dishonest people may try to trick a client, and/or a user of a client, into providing personal information. Unidentified rogue 112 may try to copy or look like a legitimate server and/or web site to obtain identity and/or other information from a client 102. With the exemplary embodiments disclosed herein, when the client requests an identity key, unidentified rogue's identification key will be provided to the client and, thus, the client may discern that it is not a server previously visited. Furthermore, when the client requests markers previously stored on the server, unidentified rogue will have no markers as the client and/or user has not previously accessed the website of the unidentified rogue. Either of these scenarios would alert a user of a client 102 that the web site and/or server is not to be trusted, and the user should be wary of disclosing identity or other information.

With this exemplary embodiment a user and/or client may have more levels of security that may inhibit unidentified rogues from obtaining personal information by spoofing a web site. Furthermore, this may also inhibit the "man in the middle" interception of information to provide further security.

As noted above, this attendance marker may also be utilized to authenticate the web site to provide further security. This may be attractive to servers and operators of websites, who may be concerned about fraud. This may provide an extra level of user-generated security that may inhibit unidentified users obtaining confidential information.

Figure 2:
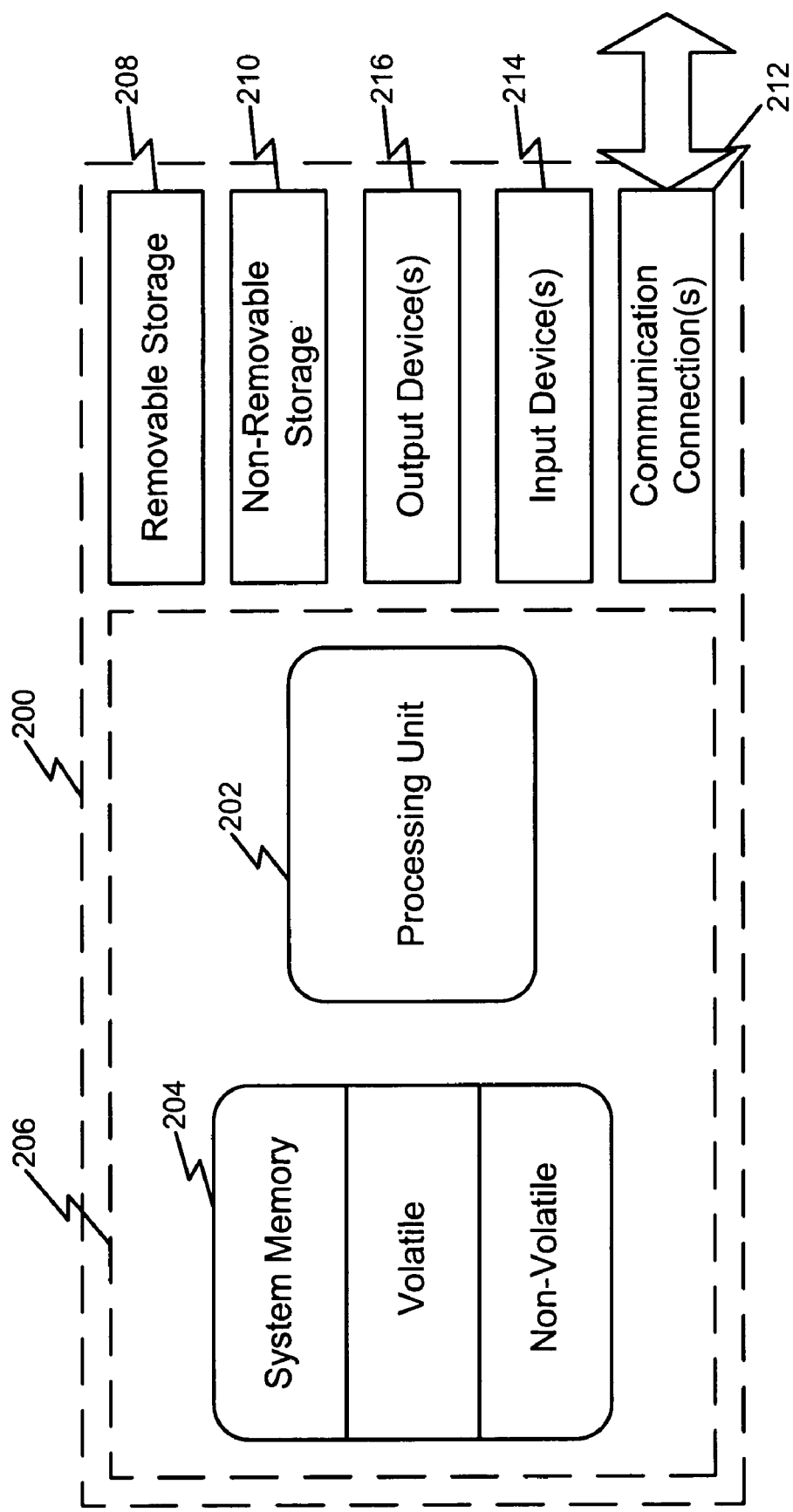
FIG. 2 illustrates an example of a suitable computing system environment on which exemplary embodiments may be implemented.

FIG. 2 illustrates an example of a suitable computing system environment on which embodiments of the invention may be implemented. This system 200 is representative of one that may be used to serve as a client and/or a server as described above. In its most basic configuration, system 200 typically includes at least one processing unit 202 and memory 204. Depending on the exact configuration and type of computing device, memory 204 may be volatile (such as RAM), non-volatile (such as ROM, flash memory, etc.) or some combination of the two. This most basic configuration is illustrated in FIG. 2 by dashed line 206. Additionally, system 200 may also have additional features/functionality. For example, device 200 may also include additional storage (removable and/or non-removable) including, but not limited to, magnetic or optical disks or tape. Such additional storage is illustrated in FIG. 2 by removable storage 208 and non-removable storage 210. Computer storage media includes volatile and nonvolatile, removable and non-removable media implemented in any method or technology for storage of information such as computer readable instructions, data structures, program modules or other data. Memory 204, removable storage 208 and non-removable storage 210 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can accessed by system 200. Any such computer storage media may be part of system 200.

System 200 may also contain communications connection(s) 212 that allow the system to communicate with other devices. Communications connection(s) 212 is an example of communication media. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. The term computer readable media as used herein includes both storage media and communication media.

System 200 may also have input device(s) 214 such as keyboard, mouse, pen, voice input device, touch input device, etc. Output device(s) 216 such as a display, speakers, printer, etc. may also be included. All these devices are well known in the art and need not be discussed at length here.

A computing device, such as system 200, typically includes at least some form of computer-readable media. Computer readable media can be any available media that can be accessed by the system 200. By way of example, and not limitation, computer-readable media might comprise computer storage media and communication media.

Figure 3:
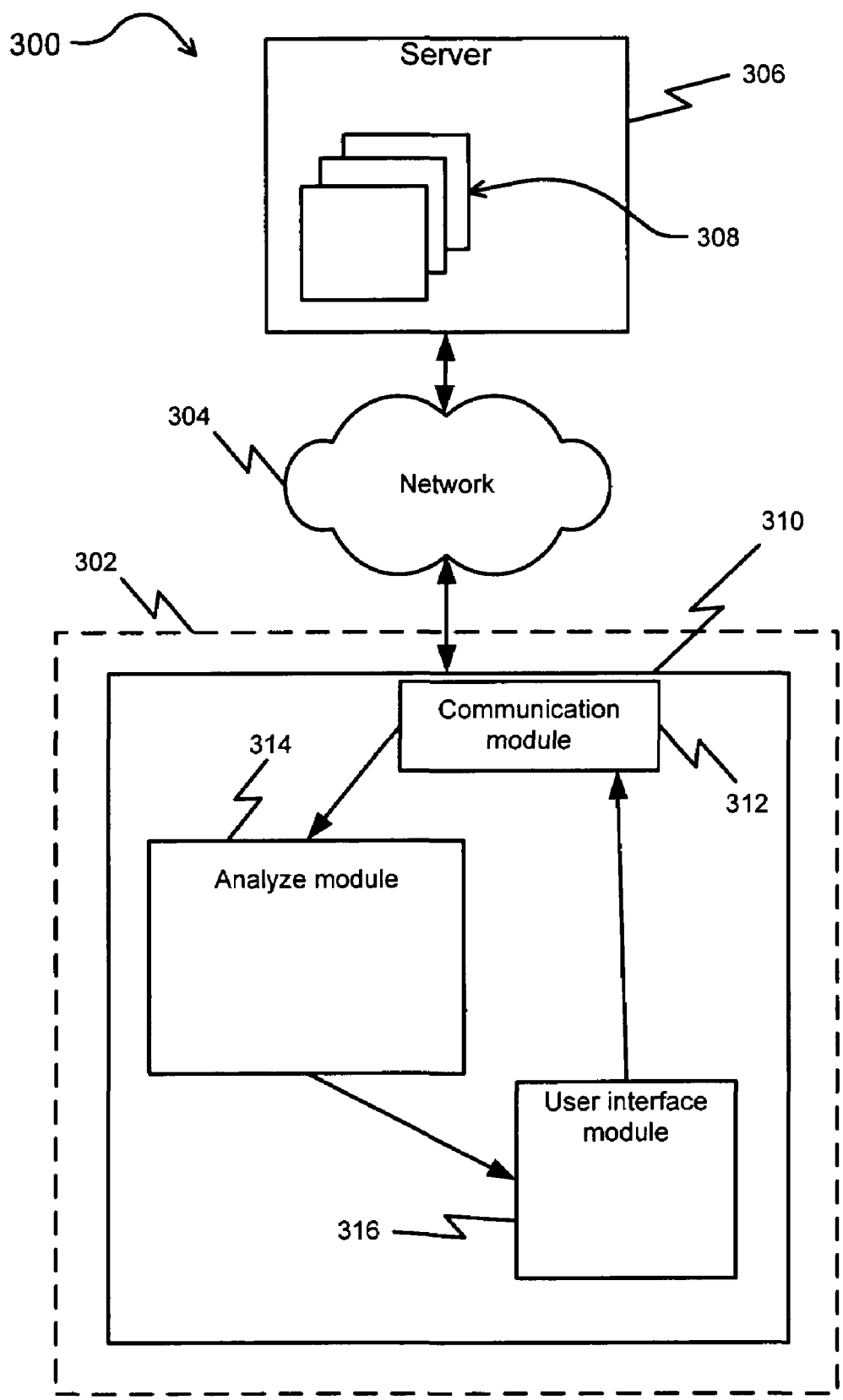
FIG. 3 is a block diagram of a system for creating attendance marker(s) and authenticating a system according to an exemplary embodiment.

FIG. 3 illustrates, at a conceptual level, a system for safely disclosing identity or other information over the Internet according to an exemplary embodiment, generally at 300. This example illustrates system 300 including a client 302 and a server 306 connected via a network 304 or other channel. As will become apparent, most devices can function as both a client 302 and a server 306 at various times. However, for simplicity, these functions are illustrated separately here. Additionally, network 304 may be almost any type of network including the Internet or may be some other type of channel suitable for establishing communication between the client 302 and the server 306.

Client 302 may be a client, such as a personal PC accessing a website via the Internet. It will be appreciated, however, that other devices and configurations may be utilized without straying from the concepts disclosed herein. Similarly, the server 306 may be a host for a website, device, or other system, or other configuration.

In this embodiment system 300 includes a client 302 coupled to a network 304. Furthermore, system 300 includes a server 306 with associated content 308. The server is also coupled to network 304. Server 306 includes content 308, which may be in the form of a website, or other configuration.

Client 302 includes a secure desktop 310. Secure desktop 310 may be in the form of software code and modules that are in a highly protected area and may be very difficult to break into and surreptitiously obtain information from a user, or tamper with the information. This may also make the secure desktop very difficult to imitate, and may be protected such that spy ware would not be able to record keystrokes, or otherwise intercept information.

Secure desktop 310 includes a communication module 312, which is configured to receive and send communication via network 304 to server 306, among others. Communication module may receive communication from server 306 and may then pass it to analyze module 314.

Analyze module 314 may be configured to parse the incoming information to present it to the user via secure desktop 310 and/or user interface module 316. Analyze module 314 may evaluate the type of information received, and may present to the user inputs that are requested by server 306. As described above in FIG. 1, the information received may include identity key information, as well as markers previously left at the server by the client 302, as well as other information. Furthermore, analyze module 314 may send the information to the user interface module 316 and/or the user in a uniform manner such that the user may be more comfortable and feel more secure when disclosing information to server 306.

User interface module 316 may have a finite number of states or displays such that any abnormalities or irregularities in the user interface would provide visual cues or indicators to the user that something is amiss. User interface module 316 may also include areas for the user to input information to be transmitted to the communication module 312, which may then transmit that information to server 306. In this manner the user may be provided with an interface that is somewhat uniform and may display server identity information, as well as other secret or personal information of the user in a uniform manner such that the user would be less likely to provide identity or other information to rogue websites or imitators.

It will be appreciated that although secure desktop 310 is shown as residing on client 302 it could reside on an external device and/or remote server, including a web server or network server, and the like. Furthermore, although secure desktop 310 may be described as software modules it may be a combination of hardware, firmware and/or software modules and/or combinations thereof.

The information may also be utilized to determine the authenticity of the server 306, such that the client 302 and the user of the client 302 may be more confident that the server 306 and/or associated websites and systems are authentic and/or legitimate. Among other benefits, this may reduce fraud, and increase user confidence before the user discloses identity information or other sensitive information to the server 306. This authentication may provide consistent recognition of an ongoing digital relationship, and authentication of servers, web sites, and/or systems.

If the client 302 receives anything other than expected information, this may indicate that the client 302 has not previously accessed this server 306. This may also indicate that the legitimate site is being imitated or that the server 306 has lost the key, among other scenarios. This may indicate to the user of the client 302 that the server 306 is not trustworthy, and that the user should disconnect from the server 306, or proceed with caution and/or not divulge any sensitive, confidential, and/or identity information.

Figure 4:
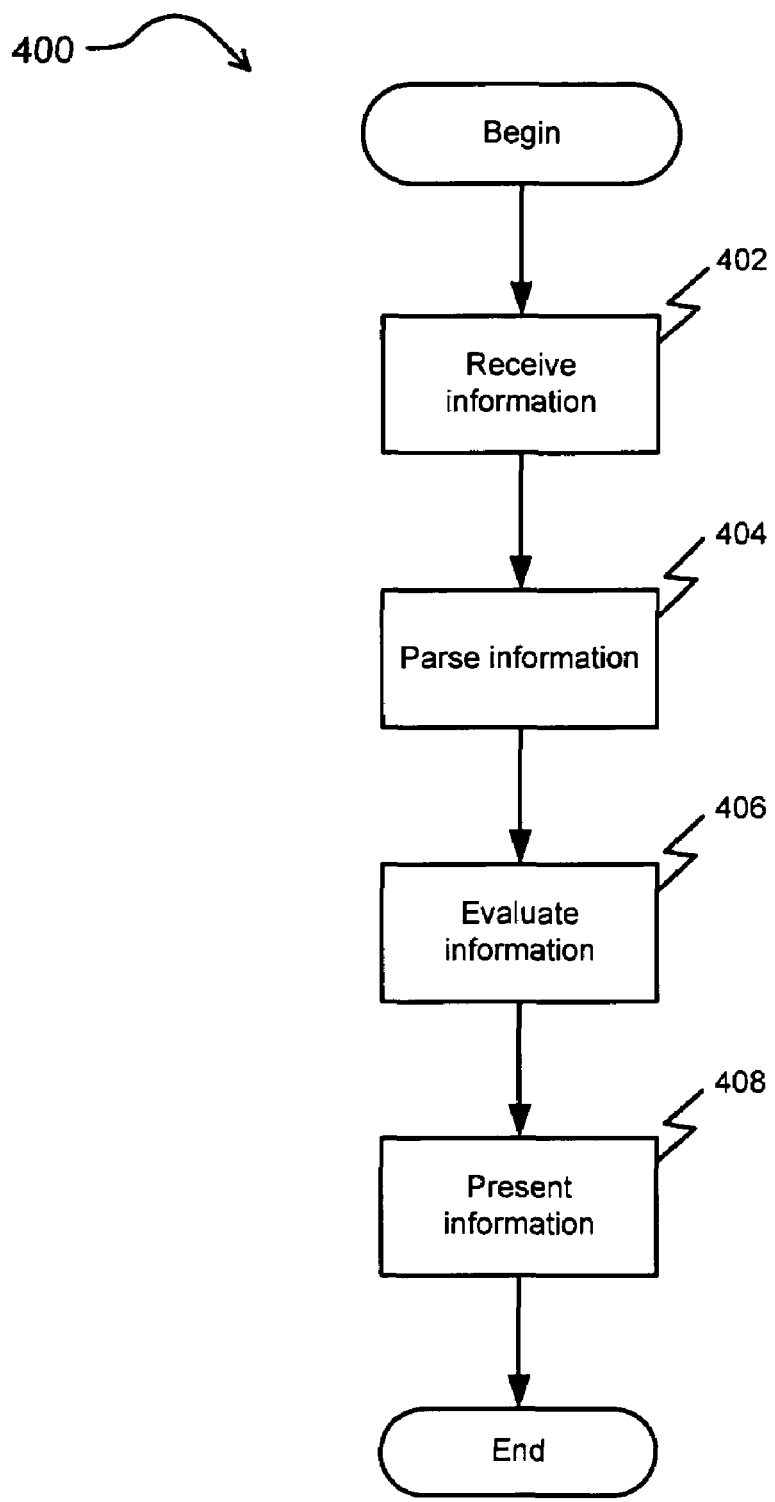
FIG. 4 is a flow diagram illustrating operational characteristics involved in creating an attendance marker and recognizing an ongoing digital relationship according to an exemplary embodiment.

FIG. 4 is a flowchart illustrating an exemplary embodiment of a method for presenting information to a user according to an exemplary embodiment, generally at 400. Method 400 includes receive operation 402. Receive operation 402 includes receiving information, which may include an identity key from a server or other entity. The identity key may include identity information about the server, including, but not limited to a unique URL, a principal owning the system, and/or other identification information. Furthermore, the identity key may be a portion of a certificate, such as a security certificate, or other certificate, that is associated with the server. The identity key may be parsed out of the certificate. Control then passes to the parse operation 404.

Parse operation 404 may include dividing the information into different portions. The different portions may include identity information, markers previously stored at the server, information requests by the server from the client and/or user, and/or other information. Control then passes to evaluate operation 406.

Evaluate operation 406 includes evaluating the received information to determine the identity of the server, requests from the server, and other information. It will be appreciated that other information and/or combinations of information may be utilized without straying from the concepts disclosed herein. Once the information has been evaluated, control then passes to present operation 408.

Present operation 408 includes presenting the information to the user in a generally uniform way. These may be a finite number of states or user interfaces that may be available. This limited number of user interfaces may make the user more at ease when dealing with servers and web sites. This may also make it easier for a user to identify imitation web sites, or otherwise when conditions and information are irregular, such that the user may more easily identify problems with disclosing information to a web site or other system.

Figure 5:
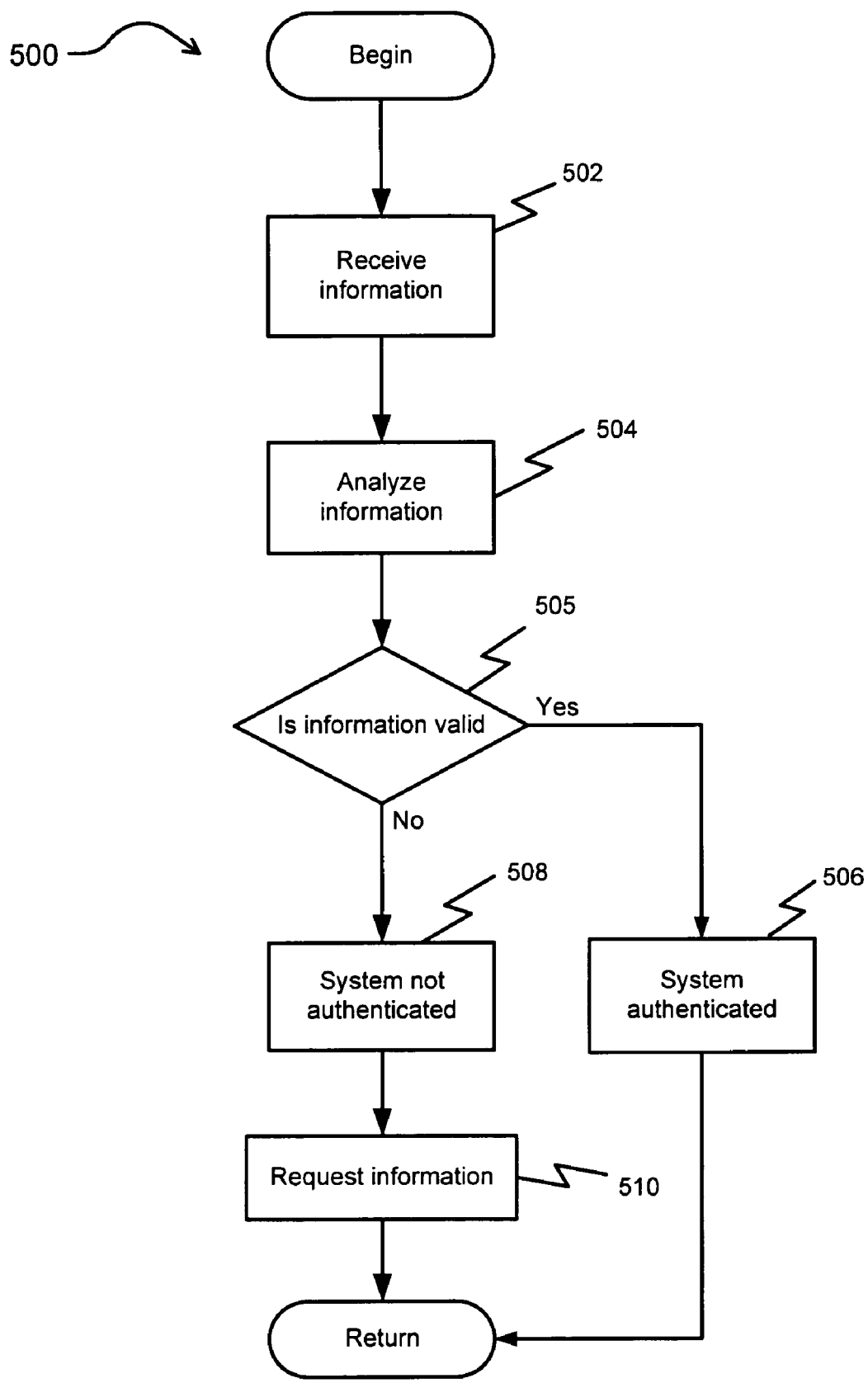
FIG. 5 is a flow diagram illustrating operational characteristics involved in authenticating a system according to an exemplary embodiment.

FIG. 5 is a flowchart illustrating a method for determining authenticity of a server, system, or web site according to an exemplary embodiment, generally at 500. According to aspects of method 500, processing begins with receive operation 502. Receive operation 502 may comprise receiving a certificate, identity key, and other information associated with a server from the server or other entity over a channel such as described above. As described above the information may include identity information about the server and/or associated web site, as well as requests for information from the client, among other information. Control then passes to the analyze operation at 504.

Analyze operation 504 includes parsing the information to retrieve the various portions of information. These portions include the identity information about the server and associated website(s), and the requests for information from the client, among others. Analyze operation 504 may then present the information to the client in a uniform manner via a secure desktop and/or finite state user interface. With this configuration, control of the information requested and provided is with the user, not the server or web site. This may allow a user to be more comfortable that the information presentation and transfer is secure. Furthermore, this configuration may make it more likely that the user will be able to identify anomalies with the server and information presented, and be wary of continuing to visit the server or disclose information to that server. Control then passes to query operation 505.

Query operation 505 includes determining by the user whether information presented about the server and associated web site is valid and the server is who they purport to be. The user may be provided with visual indicators that may indicate, among other things, the identity of the server, indication of an ongoing digital relationship, indication of previously exchanged security keys and/or other information. The user may then utilize these indicators to determine if the server is a valid server. If it is determined that the server is valid, control passes to system authenticated 506. This indicates that the client has previously accessed the server and stored and/or associated a security key with the server, or the user otherwise trusts the server, and continues to interact with the server.

If it is determined that the information is not valid, control passes to the system not authenticated 508. If the system is not authenticated, the user may choose to leave the web site or disconnect from the server. Furthermore, the user will be alerted and may be wary of disclosing any information to the server. Control then passes to the request function 510.

Request function 510 may include requesting an identity key or other information from the server. If a client has previously accessed a server, or website, and this function is initiated, the user may have some indication that the website is not authentic. This may also indicate to the user that another entity is attempting to obtain identity information from the user. This may also indicate that the server has been tampered with. With any of these scenarios, the user of the client may have an indication that this system is not to be trusted and caution should be used when any information is disclosed to the server or web site.

The logical operations of the various embodiments of the exemplary embodiments may be implemented (1) as a sequence of computer implemented acts or program modules running on a computing system and/or (2) as interconnected machine logic circuits or circuit modules within the computing system. The implementation is a matter of choice dependent on the performance requirements of the computing system implementing the invention. Accordingly, the logical operations making up the embodiments of the exemplary embodiments described herein are referred to variously as operations, structural devices, acts or modules. It will be recognized by one skilled in the art that these operations, structural devices, acts and modules may be implemented in software, in firmware, in special purpose digital logic, and/or any combination thereof without deviating from the spirit and scope of the present disclosure as recited within the claims attached hereto.

Although the exemplary embodiments have been described in language specific to computer structural features, methodological acts and by computer readable media, it is to be understood that the exemplary embodiments defined in the appended claims is not necessarily limited to the specific structures, acts or media described. As an example, different formats other than XML may be used to encode identification information. Therefore, the specific structural features, acts and mediums are disclosed as exemplary embodiments implementing the claimed invention.

The various embodiments described above are provided by way of illustration only and should not be construed to limit this disclosure. Those skilled in the art will readily recognize various modifications and changes that may be made to the present disclosure without following the exemplary embodiments and applications illustrated and described herein, and without departing from the true spirit and scope of the present disclosure, which is set forth in the following claims.

What is claimed is:

1. A computer-implemented method of receiving and presenting information, comprising:
   receiving an indication of a visual secret from a user;
   providing the visual secret to a server;
   receiving information from the server, by a client;
   analyzing the information, including parsing the information into at least:
      an indication of the identity of the server; and
      the visual secret; and
   presenting the analyzed information to the user for validation by displaying visual indicators that include at least visual representations of the identity of the server and of the visual secret.

2. The method of claim 1, further comprising validating of the information by the user.

3. The method of claim 2, further comprising: responsive to validating, allowing further interaction between the client and the server; and responsive to not validating, terminating communication with the server.

4. The method of claim 3, wherein the further interaction comprises providing information to the server.

5. The method of claim 1, wherein the visual secret comprises an arbitrary photograph that is not related to the server.

6. The method of claim 1, further comprising:
causing an attendance marker to be stored at the server;
requesting access to the server; and
requesting that the server provide the attendance marker to the client.

7. The method of claim 1, wherein the information received in response to a request for access to the server, further comprising:
disconnecting from the server;
requesting access to the server;
receiving new information that does not include the visual secret;
analyzing the new information; and
presenting the new information to the user for validation.

8. The method of claim 1, further comprising:
providing identity information about the user to the server, wherein the information received from the server includes the identity information and displaying the visual indicators includes displaying a visual representation of the identity information.

9. A computer storage medium encoding a computer program of instructions for executing a computer process for presenting information and safely disclosing identity information over the Internet, said computer process comprising:
receiving an indication of a visual secret from a user;
providing the visual secret to a server;
receiving information from the server, by a client;
analyzing the information, including parsing the information into at least;
an indication of the identity of the server; and
the visual secret; and
providing the analyzed information to the user for validation by displaying visual indicators that include at least visual representations of the identity of the server and of the visual secret.

10. The computer feadable storage medium of claim 9, further comprising responsive to validating, allowing further interaction between the client and the server.

11. The computer storage medium of claim 9, wherein the visual secret comprises an arbitrary photograph that is not related to the server.

12. The computer storage medium of claim 9, the process further comprising:
causing an attendance marker to be stored at the server;
requesting access to the server; and
requesting that the server provide the attendance marker to the client.

13. The computer storage medium of claim 9, wherein the information received in response to a request for access to the server, the process further comprising:
disconnecting from the server;
requesting access to the server;
receiving new information that does not include the visual secret;
analyzing the new information; and
presenting the new information to the user for validation.

14. The computer storage medium of claim 9, the process further comprising:
providing identity information about the user to the server, wherein the information received from the server includes the identity information and displaying the visual indicators includes displaying a visual representation of the identity information.

15. A system for presenting information and safely disclosing identity information, said system comprising:
at least one processing unit;
at least one memory, communicationally coupled to the at least one processing unit, and containing instructions that, when executed by the processing unit, perform the following process:
receiving an indication of a visual secret from a user;
providing the visual secret to a server;
receiving information from the server, by a client;
analyzing the information, including parsing the information into at least:
an indication of the identity of the server; and
the visual secret; and
providing the analyzed information to the user for validation by displaying visual
indicators that include at least visual representations of the identity of the
server and of the visual secret.

16. The system of claim 15, wherein the visual secret comprises an arbitrary photograph that is not related to the server.

17. The system of claim 15, the process further comprising:
causing an attendance marker to be stored at the server;
requesting access to the server; and
requesting that the server provide the attendance marker to the client.

18. The system of claim 15, wherein the information received in response to a request for access to the server, the process further comprising:
disconnecting from the server;
requesting access to the server;
receiving new information that does not include the visual secret;
analyzing the new information; and
presenting the new information to the user for validation.

19. The system of claim 15, the process further comprising:
providing identity information about the user to the server, wherein the information received from the server includes the identity information and displaying the visual indicators includes displaying a visual representation of the identity information.

* * * * *